United States Patent
Sonoda et al.

(10) Patent No.: US 7,036,149 B2
(45) Date of Patent: Apr. 25, 2006

(54) COMPUTER SYSTEM

(75) Inventors: Koji Sonoda, Sagamihara (JP);
Masaaki Iwasaki, Tachikawa (JP);
Naoto Matsunami, Hayama (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 10/637,216

(22) Filed: Aug. 8, 2003

(65) Prior Publication Data

US 2004/0193879 A1    Sep. 30, 2004

(30) Foreign Application Priority Data

Mar. 27, 2003   (JP)   ............................. 2003-086906

(51) Int. Cl.
G06F 11/30     (2006.01)
G06F 12/14     (2006.01)
H04L 9/00      (2006.01)
H04L 9/32      (2006.01)

(52) U.S. Cl. .............................. 726/27; 726/2; 726/28; 726/29; 713/153; 707/1; 707/2; 707/3; 707/4; 707/5; 707/6; 707/7; 707/8; 707/9; 707/10; 707/102; 707/200; 707/202; 705/1; 705/14; 709/223; 709/330

(58) Field of Classification Search ................ 713/200, 713/201, 153; 707/1–10, 102, 200, 202; 705/1, 14; 709/223, 330; 726/2, 27–29
See application file for complete search history.

(56) References Cited

U.S. PATENT DOCUMENTS 5,410,598 A  *  4/1995  Shear .......................... 705/53
5,668,986 A  *  9/1997  Nilsen et al. ................. 707/10

(Continued)

FOREIGN PATENT DOCUMENTS

JP    2003-015931 A    1/2003

OTHER PUBLICATIONS

John Kubiatowicz et al., OceanStore, and Architecture for Gloval-Scale Persistent Storage, Proceedings of the Ninthe International Conference on Architectural Support for Programming Languages and Operating Systems (ASPLOS 2000), Nov. 2000, pp. 190-201.

*Primary Examiner*—Ayaz Sheikh
*Assistant Examiner*—Shin-Hon Chen
(74) *Attorney, Agent, or Firm*—Townsend and Townsend and Crew LLP

(57) ABSTRACT

To solve a problem of waste of management resources/wasteful management involved in the setting of information defining access rights of multiple users to a single file and the setting of differing file attributes information for each file, this system has a file attributes DB operating as a database managing file attributes, a accounting information DB as a database managing accounting information and a local file system storing file data. The accounting information DB holds records for each combination of a user or group and a server and adds records for each additional user or server.

20 Claims, 11 Drawing Sheets

U.S. PATENT DOCUMENTS

| | | | |
|---|---|---|---|
| 6,052,785 A * | 4/2000 | Lin et al. | 713/201 |
| 6,564,215 B1 * | 5/2003 | Hsiao et al. | 707/8 |
| 6,681,227 B1 * | 1/2004 | Kojima et al. | 707/10 |
| 2001/0029507 A1 | 10/2001 | Nojima | |
| 2002/0069355 A1 * | 6/2002 | Garrison | 713/153 |
| 2002/0073189 A1 * | 6/2002 | Koontz et al. | 709/223 |
| 2002/0107876 A1 * | 8/2002 | Tsuchida et al. | 707/202 |
| 2002/0152121 A1 * | 10/2002 | Hiroshi | 705/14 |
| 2002/0161757 A1 * | 10/2002 | Mock et al. | 707/5 |
| 2002/0169745 A1 * | 11/2002 | Hotti et al. | 707/1 |
| 2003/0046369 A1 | 3/2003 | Sim et al. | |
| 2003/0065646 A1 * | 4/2003 | Joseph et al. | 707/1 |
| 2003/0158847 A1 * | 8/2003 | Wissner et al. | 707/10 |
| 2003/0172089 A1 * | 9/2003 | Douceur et al. | 707/200 |
| 2003/0204856 A1 * | 10/2003 | Buxton | 725/120 |
| 2003/0225972 A1 | 12/2003 | Miyata et al. | |
| 2004/0015520 A1 | 1/2004 | Ogata et al. | |

* cited by examiner

FIG. 2

| | 2110 | 2120 | 2130 | 2140 | 2150 |
|---|---|---|---|---|---|
| | FILE-ID | USR | READ | WRITE | EXPIRE |
| 2111 | FILE1 | USR1 | 1 | 1 | 2050/1/1 |
| 2112 | FILE1 | USR2 | 1 | 0 | 2003/5/1 |
| 2113 | FILE2 | USR2 | 1 | 0 | 2003/12/ |

130

| | 2210 | 2220 | 2230 | 2240 | 2250 |
|---|---|---|---|---|---|
| | FILE-ID | OWNER | DATE | SIZE | TYPE |
| 2211 | FILE1 | USR1 | DATE1 | 1MB | PLANE |
| 2212 | FILE2 | USR1 | DATE2 | 20MB | ENCRY |
| | ... | ... | ... | ... | ... |

120

| | 2310 | 2320 |
|---|---|---|
| | FILE-ID | Location |
| 2311 | FILE1 | FSVR1:/FILE1 |
| 2312 | FILE1 | FSVR3:/FILE1 |
| 2313 | FILE2 | FSVR1:/FILE2 |
| 2314 | FILE2 | FSVR3:/FILE2 |

150

| | 2410 | 2420 |
|---|---|---|
| | FILE-ID | KEY |
| 140 | FILE2 | KEY1 |
| | ... | ... |

FIG. 3

| | 3110 | 3120 | 3130 | 3140 | 3150 | 3060 |
|---|---|---|---|---|---|---|
| | USR | FSVR-ID | USAGE VOLUME | NO. OF FILES | R SIZE | W SIZE |
| 3111 | USR1 | FSVR1 | 30M | 50 | 500M | 30M |
| 3112 | USR1 | FSVR3 | 20G | 100 | 100G | 20G |
| 3113 | USR2 | FSVR1 | 10G | 1000 | 100G | 10G |

220

FIG. 4A
WRITE REQUEST

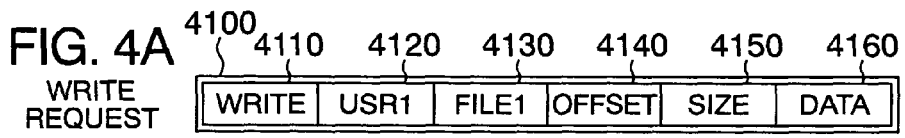

4100 / 4110 WRITE | 4120 USR1 | 4130 FILE1 | 4140 OFFSET | 4150 SIZE | 4160 DATA

FIG. 4B
READ REQUEST

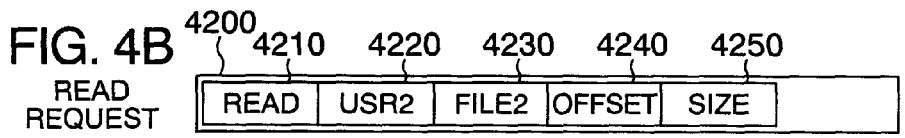

4200 / 4210 READ | 4220 USR2 | 4230 FILE2 | 4240 OFFSET | 4250 SIZE

FIG. 4C
CREATE REQUEST

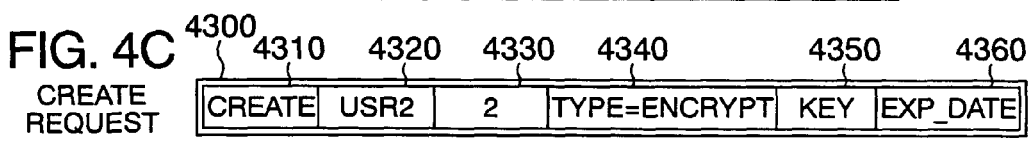

4300 / 4310 CREATE | 4320 USR2 | 4330 2 | 4340 TYPE=ENCRYPT | 4350 KEY | 4360 EXP_DATE

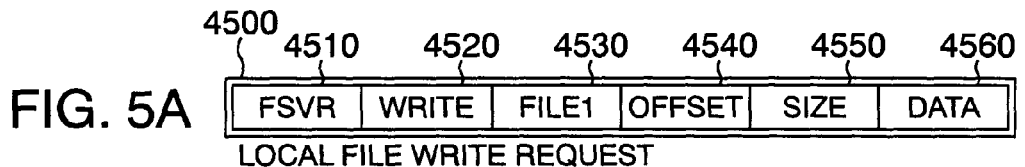
FIG. 5A LOCAL FILE WRITE REQUEST
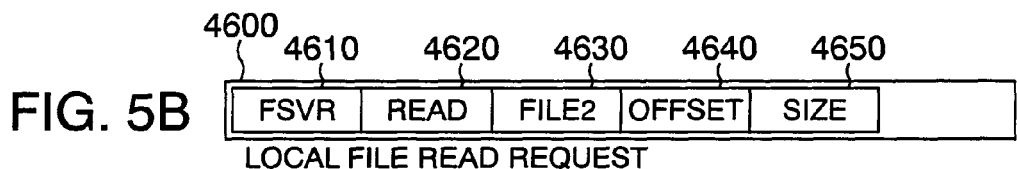
FIG. 5B LOCAL FILE READ REQUEST
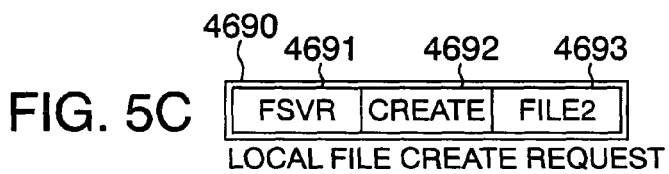
FIG. 5C LOCAL FILE CREATE REQUEST
FIG. 6
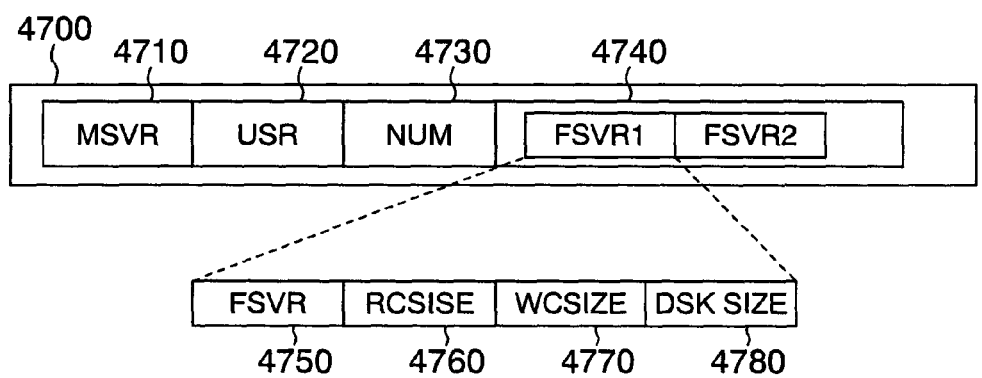

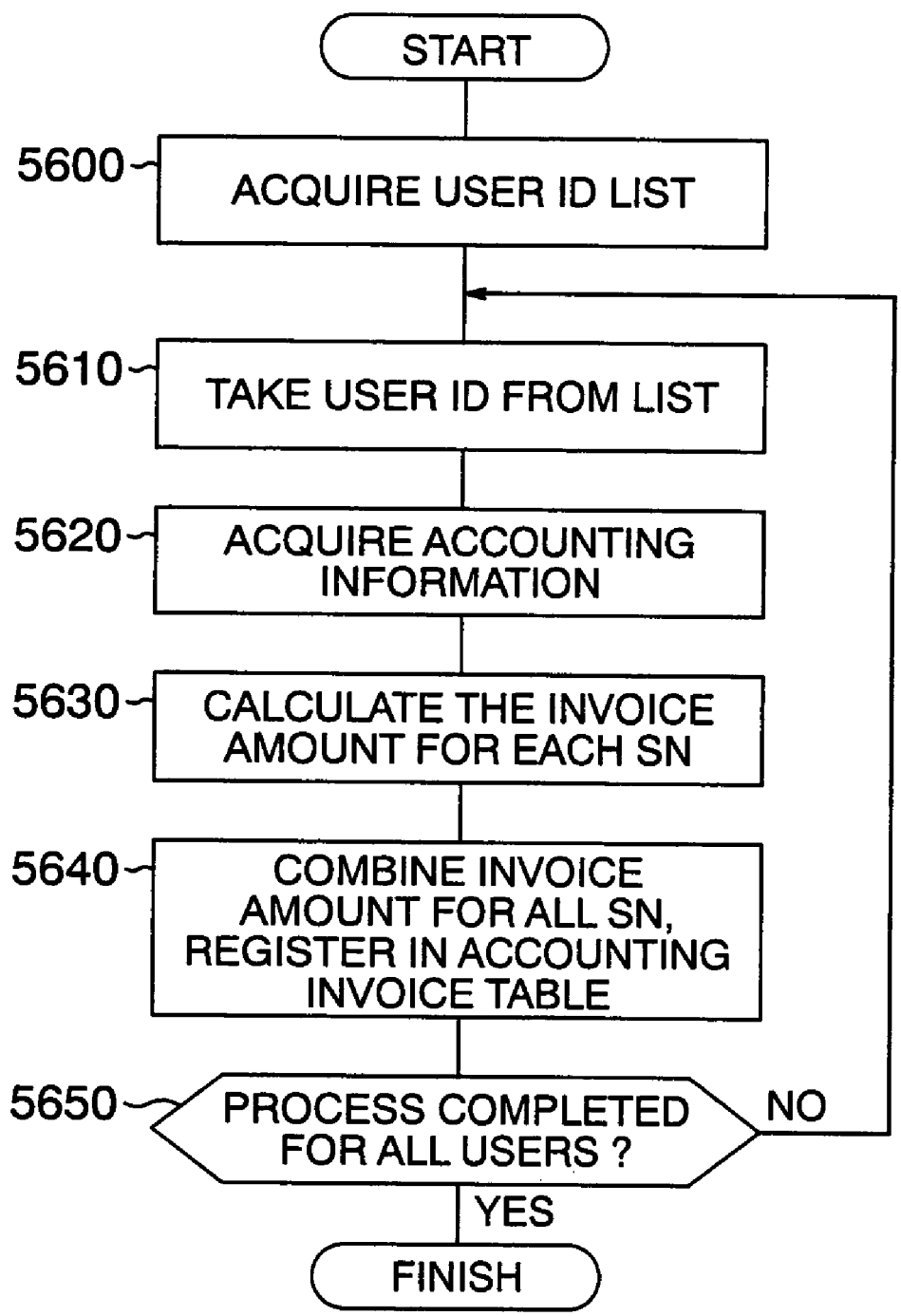

FIG. 14A

| USER ID (7000) | NAME (7010) | INVOICE RECIPIENT (7020) | COMMENT (7030) |
|---|---|---|---|
| USR1 | NAME1 | CHARGE | COMMENT |
| ... | ... | ... | ... |

| USER ID (7100) | USAGE MONTH (7110) | INVOICE AMOUNT (7120) |
|---|---|---|
| USR1 | MONTH | AMOUNT |
| ... | ... | ... |

| FSVR (7200) | VOLUME UNIT PRICE (7210) | FILE UNIT PRICE (7220) | READ UNIT PRICE (7230) | WRITE UNIT PRICE (7240) |
|---|---|---|---|---|
| FSVR1 | U_VOL | U_F | U_READ | U_WRITE |
| ... | ... | ... | ... | ... |

950

COMPUTER SYSTEM

BACKGROUND OF THE INVENTION

This invention concerns a system realized by using a plurality of network connected computers.

In recent years the volume of data provided by computers providing a service over a network and the number of users using these computers via a network has increased substantially in line with the increased diffusion throughout society of networks such as the Internet.

However, with conventional concentrated type computer systems in which a single computer manages all data required by a user the processing capabilities of the computers are limited and it is not possible to exceed those performance limits and provide all users with the data they require. The storage capacity of the storage devices connected to such computers is limited, moreover if there is computer failure it is not possible to access data.

This invention discloses technology for a dispersed type of computer system that solves these problems.

The technology disclosed in Document 1 "OceanStore, an Architecture for Global-Scale Persistent Storage," John Kubiatowicz et al., appearing in Chapter 2 of Proceedings of the Ninth International Conference on Architectural Support for Programming Languages and Operating Systems (ASP-LOS 2000), November 2000 provides for placement and replication of data in each of a plurality of storage devices and servers installed in geographically dispersed locations (hereinafter referred to as "sites"). This allows the load for data processing and the data itself to be dispersed through a plurality of servers. Further, if any of these servers fails the data can be reconstructed using replicated data in other servers.

Hereinafter, any conglomeration of data like a program for example used by a user or a computer is referred to as a "file."

Conventional concentrated management computer systems and the server infrastructure environment with servers dispersed on a global scale as disclosed in Document 1 allow a plurality of users to access files managed by computers. In order to ensure security under such an environment access rights to files must be set for each user of the system. Moreover, in order to accommodate the various uses demanded by the many users, it may be necessary to set file attributes as conditions dictate in response to such uses for each individual file in such a computer system.

With conventional programs (hereinafter "file systems") managing files run by a computer, the types and number of file attributes that can be set for a file are limited. Further, as file attributes are managed and fixed for the entire file system it is not possible to increase or decrease the number and types of file attributes applicable to each individual file at will, so there is a lack of flexibility in file attributes management.

Moreover, when there are storage service providers performing services for storage and replication of files in storage devices managed by computers existing at a plurality of sites, different conditions for charges (hereinafter "accounting policy") may be applied by providers for different storage devices managed by computers at each of those sites, thereby creating a demand to acquire information necessary for accounting (hereinafter "accounting information") based on the relevant accounting policy. The only file attributes information that can be acquired with existing file systems is static information such as file capacity or the number of file accesses, while specific accounting information based on the accounting policy of a site, information on for example the type of storage device housing a file, cannot be collected.

SUMMARY OF THE INVENTION

It is therefore an object of the present invention to provide a computer system in which there is flexibility to add or delete file attributes.

A further object of the present invention is to provide a computer system that acquires accounting information reflecting the different accounting policies of a plurality of sites.

In order to achieve the above objectives the computer system according to the present invention comprises a first computer for managing a storage device holding data for managing files (hereinafter "file management information") stored in the computer system and a second computer connected to the first computer via a network, for managing a storage device holding the actual data of files (hereinafter "file data").

In this computer system the first computer receives a file access request from a user and searches file management information that it manages based on the content of the file access request, then, in accordance with the content of the information thus searched, this first computer transmits to the second computer via the network, a file processing request coordinated in response to the file access request. Upon receiving this file processing request, the second computer performs the processes specified by that file processing request and transmits the result to the first computer. Upon receiving this result the first computer transmits a result to the user based on the content of the result it received.

This file management information may include information on file attributes, as well as information on whether or not a file can be used and information showing file storage devices of the system.

Further, information on file attributes may include a table managing only files containing one of various file attributes. Here, one such conceivable attribute could be whether or not a file is encrypted but others are conceivable.

Moreover, this file management information may include accounting information, basically, information concerning usage of a file of each second computer by a user using the file. Here, as the first computer receives a file access request from the user, it updates information concerning file usage of each second computer in response to the content of the access.

Additionally, this computer system may have a computer for accounting management which uses accounting information in respect of each second computer and calculates charges for the user of a file.

There may be a plurality of first computers and second computers or the number of first computers may be just the number of sets of file management information stored in storage devices.

Moreover, there may be a plurality of second computers and replications of file data may be stored, dispersed through this plurality of second computers.

BRIEF DESCRIPTION OF THE DRAWINGS

FIG. 2 shows an example of the different kinds of tables of a file attributes DB.

FIG. 3 shows an example of a accounting information DB.

FIGS. 4A, B and C show examples of file I/O request commands.

FIGS. 5A, B and C show examples of local file I/O requests.

FIG. 6 shows an example of a accounting information DB update request.

FIG. 13 is a flowchart showing the processes of accounting server 900.

FIGS. 14A, B and C show respectively a user table, accounting information table and accounting policy table.

DETAILED DESCRIPTION OF THE EMBODIMENTS

Embodiments of the present invention will now be described with reference to the drawings.

Figure 1:
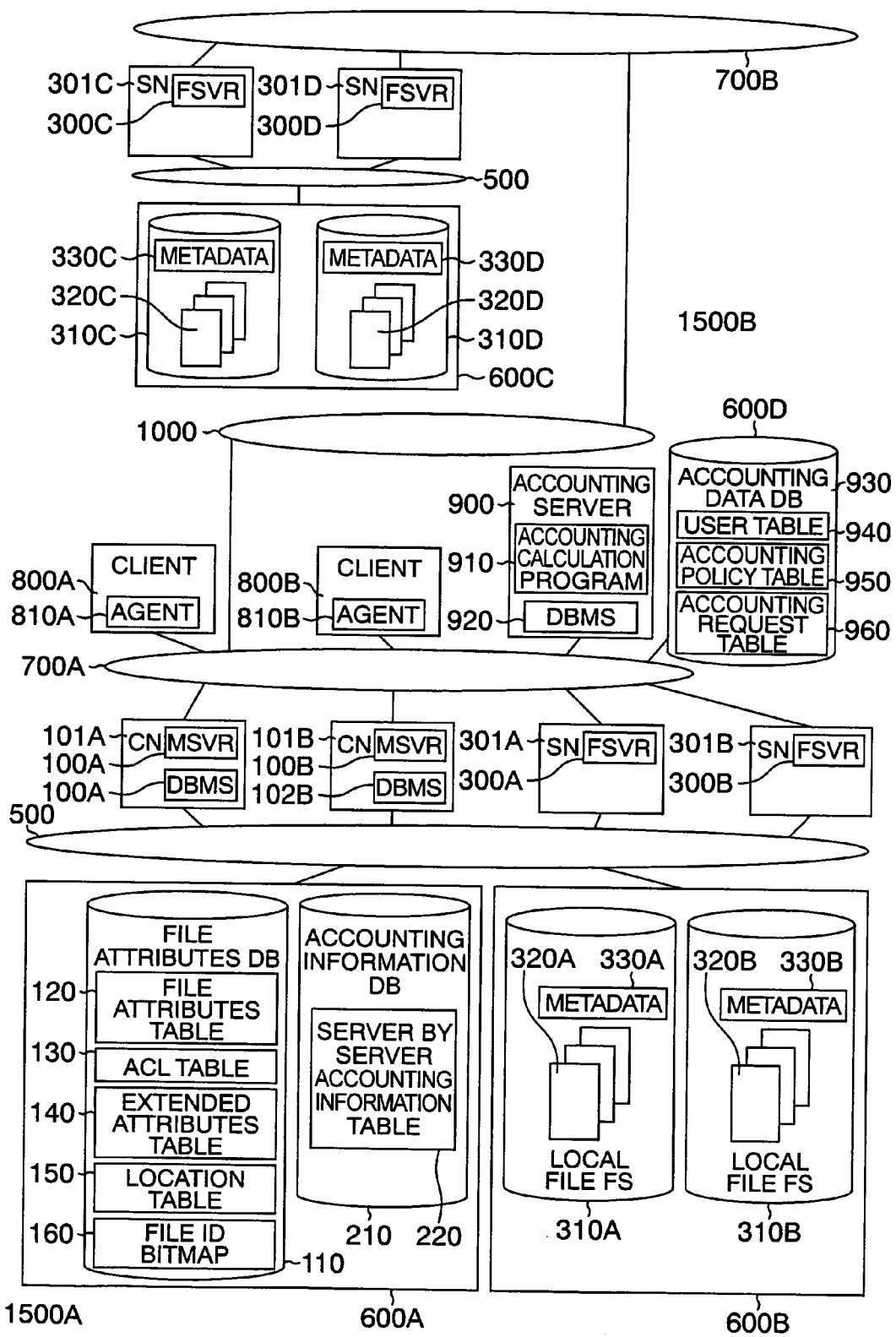
FIG. 1 shows an example of the overall configuration of a computer system according to the present invention.

FIG. 1 shows an embodiment of a computer system according to the present invention. This computer system comprises site 1500A and site 1500B, with connectivity between these sites via Internet 1000.

Site 1500 comprises a plurality of computers (hereinafter "clients") 800, used by users, a plurality of computers (hereinafter "CN") 101 for managing file management information (hereinafter "metadata"), a plurality of computers (hereinafter "SN") 301 for managing file data and a plurality of storage devices 600. Here, mutual interconnectivity between clients 800, CN 101 and SN 301 is provided via network 700. Mutual interconnectivity between the plurality of storage devices 600, CN 101 and SN 301 is provided via storage network 500 constructed of fiber cables or the like.

SCSI or Fibre Channel protocol is used as a transmission protocol for storage network 500.

Network 700 is connected to network 700 of site 1500B via Internet 1000. Accordingly, each client 800, CN 101 and SN 301 of site 1 can transmit through SN 301C and network 700 of site 1500B and Internet 1000.

Client 800, CN 101 and SN 301 are computers comprising a processor, memory, parts for performing input and output, a network interface and storage device.

The processor of CN 101 runs a server program that performs management of metadata (hereinafter "MSVR") and a server program that performs management of the database storing metadata (hereinafter "DBMS"). These programs are stored in memory. The processor of SN 301 runs a server program that performs management of file data (hereinafter "FSVR") 300. FSVR 300 is stored in memory of SN 301.

A storage device 600 comprises a control part and a storage part. An electromagnetic disk, semiconductor disk or optical disk may be used as a storage medium of the storage part. Further, a storage device 600 may include for its storage part a disk device that uses one of such disks or a storage device system such as a disk array using a plurality of disk devices.

CN 101 and SN 301 run respectively MSVR 100 and FSVR 300 and cooperate to perform management of files stored in storage device 600. According to this embodiment metadata such as file attributes and accounting information for example and file data are respectively managed through different computers and different storage devices 600. This allows flexible management of file attributes.

In the storage part of storage device 600A are stored file attributes database (hereinafter "DB") 110 and accounting information DB 210 for accounting information on each user. In the file attributes DB110 are stored file attributes table 120, ACL table 130, extended attributes table 140, location table 150 and file ID bitmap 160. In accounting information DB 210 is stored server by server accounting information table 220.

CN 101A runs MSVR 100A and manages file attributes corresponding to file data stored in storage device 600B and 600C using file attributes DB110. CN 101 A runs MSVR 100B and uses DB 210 for managing information for calculating accounting applied to a user when the user uses a file stored in the computer system.

A local file system (hereinafter "local FS") 310 is stored in storage devices 600B and C. Local FS 310 comprises file data 320, metadata 330 for managing file data and a program for managing said metadata 300 and said file data. Information showing the data volume and storage locations in storage device 600 of file data 320 managed by local FS 310 is stored in metadata 330.

SN 301 runs FSVR 300, to control and manage local FS 310. Local FS 310A is managed by SN 301A, local FS 310B is managed by SN 301B, local FS 310C is managed by SN 301C and local FS 310D is managed by SN 301D.

The computer system according to this embodiment operates such that when a client 800 creates a file a plurality of files with the same contents are automatically created at CN 101. File data of each of that plurality of files is transmitted to different SN 301 and then stored in the respective local FS 310 managed by those SN 301. File data stored in each of these local FS 310 is hereinafter referred to as local files.

According to this embodiment, a plurality of such local files exists for each file. The storage location for each of these local files is decided by CN 101 and the information showing this storage location is registered in location table 150 in file attributes DB110 in accordance with instructions from CN 101. CN 101A runs MSVR 100A to manage basic file attributes such as file size and creation date in file attributes table 120.

Moreover, CN 101A runs MSVR 100A to manage access rights to files for each client 800 through ACL table 130. Again, CN 101A runs MSVR 100A to manage other file attributes through extended file attributes table 140.

CN 101B runs MSVR 100B and uses accounting information DB 210 to manage information necessary for accounting a user using files.

Generally, because characteristics such as performance and reliability of each storage device 600 managed by SN 301 differ, the accounting policy applied to users may differ for each SN 301 or storage device 600. Accordingly, CN 101B creates a accounting information record for each pair of a user and SN 301 managing the storage device 600, and by registering the records in server by server accounting information table 220, collects accounting information for each SN 301 and/or each site.

According to this embodiment CN 101 manages accounting information and file attributes using a relational type database.

FIG. 2 shows an example of the composition of the tables of file attributes DB 110. File attributes shared by all files are stored in file attributes table 120. File attributes table 120 comprises the entries FILE-ID 2210 in which a file identifier is registered, OWNER 2220 in which is stored the ID of the file owner, DATE 2230 in which a file's creation date is stored, SIZE 224 that stores information on file size and TYPE 2250 that stores information showing file type. There is one record for each file in file attributes table 120.

Information concerning access rights restrictions applied to each user for a file is stored in ACL table 130. Basically, ACL table 130 is comprised of each of the entries FILE-ID 2110 in which is registered a file's identifier, USR 2120 in which a user' identifier is registered, READ 2130 and WRITE 2140 in which is registered information on whether read access right and write access right to a file exist or not and EXPIRE 2150 in which is registered information on the expiration of a time period in which it is possible to access a file. Records corresponding to the combination of a file and a user exist in ACL table 130 for the number of file-user combinations that exist.

Extended attributes table 140 is used as an attributes table for managing attributes corresponding to a file's type. FIG. 2 shows an example of extended attributes table 140 used as an attributes table for managing encryption file attribute. Here, extended attributes table 140 comprises the entries of FILE-ID 2410 in which is registered a file's identifier and encryption KEY 2420 in which is registered encryption key information.

Here, if the file managed by this computer system is an encrypted file the extended attributes table 140 shown in FIG. 2 is used (the encrypted file is registered in that table) but if the file is of another type, this extended file attributes table 140 is not used (the file is not registered in that table). In this way, files of specific types can be managed through specific tables as an extended attributes table 140 storing file attributes is established individually for each file attribute. Management in this way enables management of a variety of different file attributes without an excessive increase in the size of a table.

Information showing the storage location of file data is held in location table 150. Location table 150 comprises the entries of FILE-ID 2310 in which a file's identifier is registered and location 2320 in which is registered the location of stored file data.

The entry FILE-ID is included in all of the above-mentioned tables, file attributes table 120, ACL table 130, extended attributes table 140 and location table 150. Accordingly, each table has a structure of a relational database providing mutual interaction between them using the entry of the FILE-ID, enabling necessary file attributes to be searched as required.

FIG. 3 shows an example of the composition of server by server accounting information table 220 which comprises each of the entries USR 3110 in which a user's identifier is registered, FSVR-ID 3120 in which is registered an identifier of an FSVR 300 run by SN 301, usage volume 3130 in which is registered the total volume of files stored in a storage device 600 managed by SN 301 executing FSVR 300, Total No. of Files 3140 in which is registered the number of files stored in a storage device 600 as well as Rsize 3150 in which is registered the volume of data read by a user from storage device 600 and Wsize 3160 in which is registered the volume of data written-in by a user to storage device 600.

Because server by server accounting information table 220 accumulates information on usage by a user of local FS for each SN 301 (basically, FSVR 300 run by SN 301), it has records for each user-SN 301 pair.

CN 101B runs MSVR 100B, and by searching the contents of accounting information DB 210 using information registered in USR 3110 as the key, is able to acquire information on the conditions of usage of each user of storage devices 600 managed by each SN 301.

The description of this embodiment has used an example wherein file attributes DB 110 and accounting information DB 210 are managed using relational databases however it is also suitable to use object oriented databases or XML databases.

The processes involved according to the present invention when a user reads-out a file or updates a file (writes data to a file) will now be described.

Updating of a file by a user according to this invention will now be described. For the purposes of this explanation it is assumed that a file, "FILE 1" has already been created in this computer system. When a user (given USR 1 for an identifier) that uses client 800A performs an update of data in FILE 1, first client 800A runs AGENT 810 and transmits a file update request (hereinafter "WRITE request") 4100 to CN 101A.

The top layer of FIG. 4 shows a basic example of a write request transmitted from client 800A to CN 101A. Write request 4100 includes entries of command type 4110, user identifier 4120, file identifier 4130, write commence offset 4140, data size 4150 and data 4160.

Basically, the following information is registered in the respective entries of the write request according to this embodiment. In the entry command type 4110 is shown "WRITE" indicating that this request is a data update request, in the entry user identifier 4120 is "USR 1" information showing the user issuing the request, and in the entry file identifier 4130 is registered the information "FILE 1" specifying the file that is the subject of the operation.

In the entries write commence offset 4140, data size 4150 and data 4160 is stored respectively, the location inside the file of the data to be updated, the data size and the actual data itself.

Figure 7:
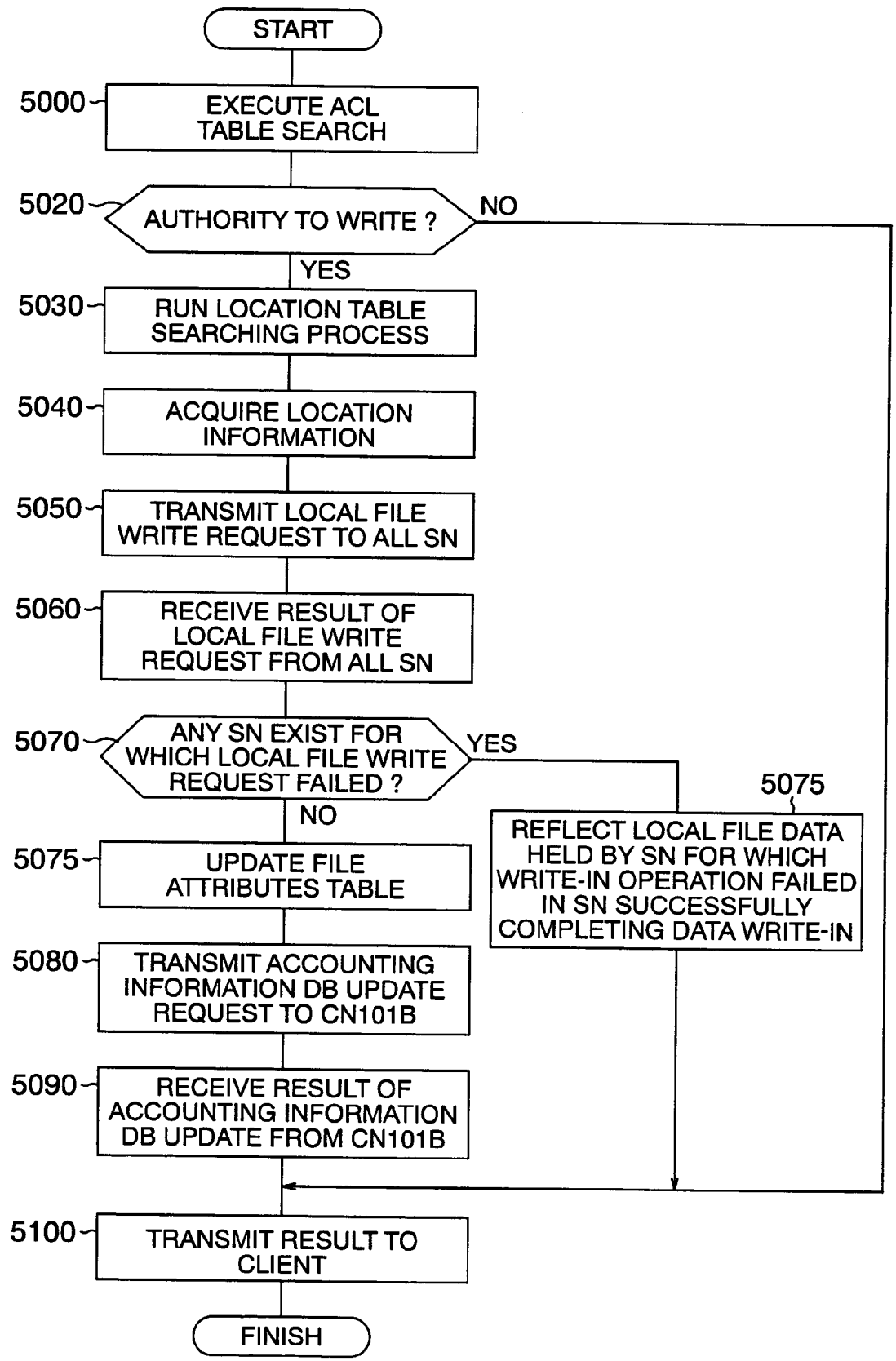
FIG. 7 is a flowchart showing the processes of MSVR 100A.

FIG. 7 is a flowchart showing the processes of CN 101A after receiving a write request 4100. CN 101A executes these processes by running MSVR 100A.

Upon receiving write request 4100, in order to confirm access rights of the user, CN 101A creates a search request to search ACL table 130 stored inside storage device 600A using the received FILE 1 file identifier and USR 1 user identifier as the key. CN 101A commences running DBMS 102A in order to run this search request produced.

Figure 11:
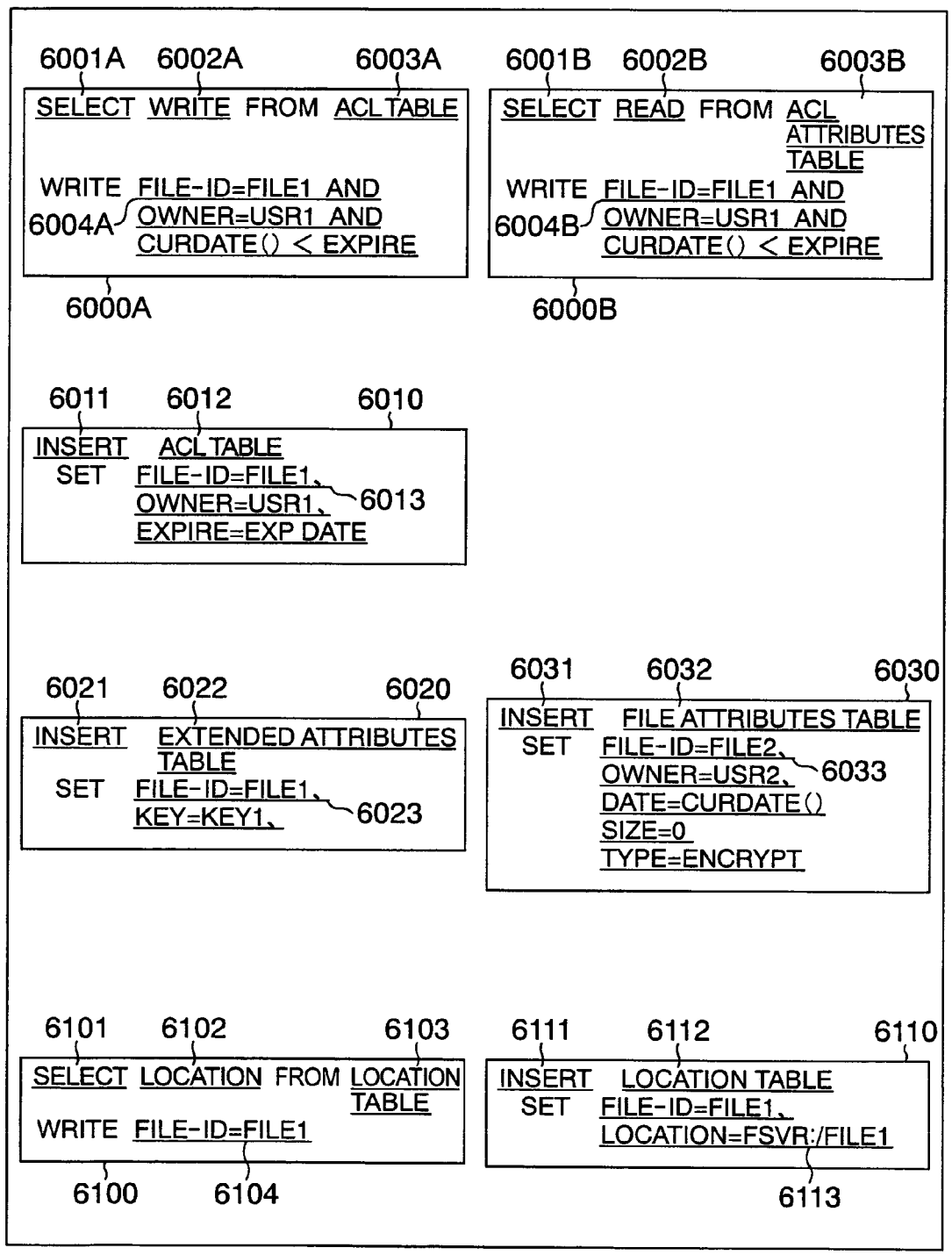
FIG. 11 shows examples of an ACL table searching request and registration request, an extended attributes table registration request and a location table searching request and registration request.

FIG. 11 shows the contents of ACL table search request 600A that provides a basic example of a search request.

ACL table search request 6000 comprises the entries of command name 6001, select field name 6002, searching subject table name 6003 and reference conditions 6004. In the example of FIG. 11, command name 6001A specifies "SELECT", select field name 6002A specifies "WRITE", searching subject table name 6003A specifies "ACL TABLE" and searching conditions 6004A are "FILE-ID=FILE1 AND OWNER=USR 1 AND CURDATE( )<EXPIRE".

Basically, the above described registered contents specify that a record for which the registered file-ID is FILE 1, the owner field is USR 1 and the expire field has a period for which the value is greater than the current date must be searched from ACL table 130.

By running DBMS 102A, CN 101A specifies that the searching processes instructed in ACL table search request 6000 be performed in file attributes DB110 and receives the results from storage device 600A. Here, high-speed database searching technology is used in the searching processes executed by CN 101A running DBMS 102A. For example, high-speed searching processes can be performed using a method like that described in U.S. Pat No. 6,353,820B1.

According to this embodiment the record that fulfills searching conditions 6004 of ACL table searching request 6000 is record 2111 so as a result of the searching operation the value registered in WRITE field 2140 of record 2111 is transmitted to CN 101A (step 5000).

Thereafter CN101A decides whether or not the WRITE request is authorized or not based on whether or not the value of WRITE field 2140 thus transmitted is 1. According to this embodiment, when that value is 1 it shows that access is authorized to the file. Accordingly, as the value in the extracted WRITE field 2140 is 1, CN 101A decides that this write request is authorized (step 5020).

When the value of WRITE field 2140 is 0, CN 101A decides the write request is not authorized, notifies this non-authorization to the client 800A and terminates procedures (step 5100).

When the write request is authorized, CN 101A must next ascertain the location of the file to be updated. To do this, CN 101A creates a location table search request 6100 and by running DBMS. 102A to reference location table 150, acquires location information including information that shows the location of the file for updating from storage device 600A.

FIG. 11 shows an example of a location table search request 6100. In this location table search request 6100 for acquiring the storage location of FILE 1, the information "SELECT" is registered in search command 6101, "LOCATION" is registered in acquire field 6102, "location table" is registered in searching subject table 6103 and the information "FILE-ID=FILE 1" is registered in searching conditions 6104.

Using this location table search request 6100, CN 101A running DBMS 102A, specifies searching of location table 150 to storage device 600, and acquires from storage device 600A information concerning records 2311 and 2312 that have "FILE 1" specified in the file-ID field.

Thereafter, CN 101A extracts the information "FSVR 1:/FILE 1" and FSVR 3:/FILE 1" stored in location field 2320 from these records (step 5030, 5040).

The CN 101A having acquired the values stored in location field 2320 transmits a local file write request to all SN 301 included in those values.

The top layer of FIG. 5 shows a basic example of a local file write request 4500. This local file write request 4500 includes the entries transmission destination FSVR 4510, local file I/O command 4520, local file name 4530, offset 4540, size 4550 and data 4560.

According to this embodiment, information indicating SN 301A and C is registered in transmission destination FSVR 4510. In local file I/O command 4520, WRITE, showing that it is a local file update request is registered. In each of the other entries, the respective information showing the location of a local file (step 5050) is registered.

Figure 8:
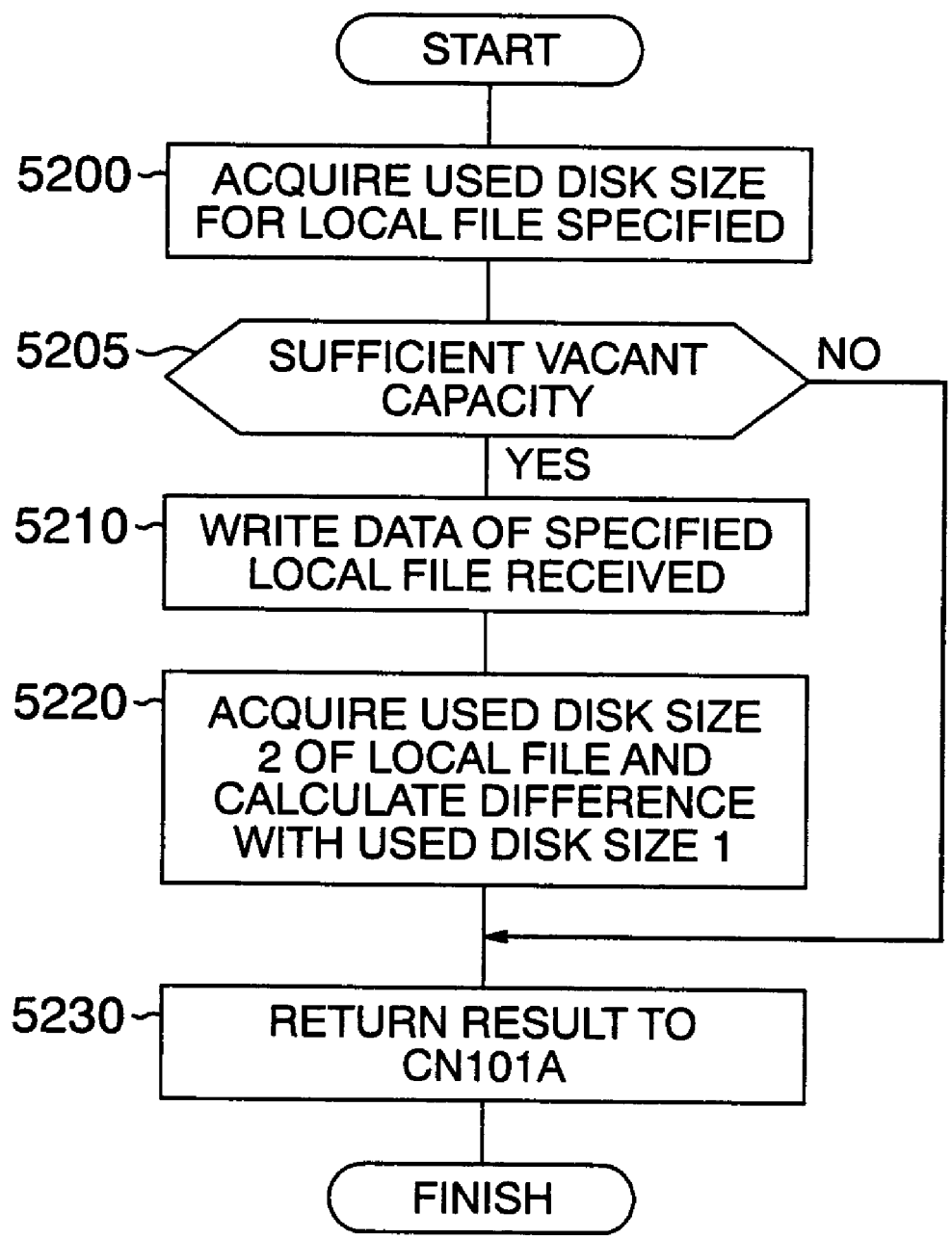
FIG. 8 is a flowchart showing the processes of FSVR 300.

FIG. 8 is a flowchart showing the processes of SN 301A (and 301C) after receiving local file write request 4500. Upon receiving local file write request 4500, SN 301A first refers metadata 350A stored in storage device 600B and acquires the size (hereinafter "used disk size") in storage device 600 used for the local file 4530 specified in the local file write request received. As described, in addition to the size of data and the location of a local file stored in local file FS 310A, metadata 330A includes information on used disk size (step 5200).

Next, SN 301A checks to ascertain that there is sufficient vacant space just to write-in the data received to local file system 310A and if there is insufficient space, SN 301A proceeds to step 5230 and an error is returned to CN 101A (step 5205).

Next, SN 301A performs the write-in WRITE processes of the received data into cache memory of SN 301A having just the size specified by size 4550, from the location shown in the information registered in OFFSET 4540 of the local file write request received, and performs SYNC processes to reflect in storage device 600B, the result of those WRITE processes (step 5210).

After completion of the SYNC processes SN 301A refers to metadata 330A and acquires the used disk size for the local file after completion of the write-in. Thereafter SN 301A compares the used disk size of storage device 600 before and after the local file write-in and calculates the storage space newly given to the local file through that local file write-in operation, in other words, calculating the newly allocated disk size (step 5220).

This newly allocated disk size is used when updating server by server accounting information table 220. The volume in storage device 600 used by a user must be accurately reflected in the usage volume 3130 field existing in server by server accounting information table 220.

Accordingly, although it is essential to ascertain storage volume newly allocated to cater for the WRITE processes to each local file, when there is an over write operation to a local file, processes to newly allocate storage space are not performed because the local file is already in existence, therefore the increase in used disk space cannot be ascertained. That is why the used disk size for a local file the subject of a WRITE operation both before and after the local file WRITE processes is compared and the newly allocated disk size calculated.

Finally SN 301A transmits the results of the local file WRITE processes to CN 101A. The content of that transmission to CN 101A includes information on status showing whether or not the data update in line with the local file WRITE processes was successful or not, information showing the size of the completed write-in operation (the size of data the subject of the completed write processes) and information showing the newly allocated disk size newly allocated for the size of the completed write-in (step 5230).

This description will now be continued returning for reference back to FIG. 7.

Upon receiving the results of the write-in from SN 301A (or 301C) (step 5060) CN 101A checks the information on status included in the result thus received (step 5070).

If there is an SN 301 that has a failed write-in operation, CN 101A sends a request to that SN 301 to read all data of the local file concerned stored in storage devices 600 managed by that SN 301. After obtaining that data from the SN 301, CN 101A transmits the data thus acquired to SN 301 that had a successful write-in operation and instructs those SN 301 to do a rewrite of the local file concerned in the storage devices 600 managed by those SN 301. By doing this, CN 101A returns all local files in the computer system back to the condition day were in prior to the write-in operation. Thereafter CN 101A transmits a result showing an error to client 800A (step 5075).

If the data write-in operation is successful for all local files/replications of the local file CN 101A performs update processes in file attributes table 120. Basically, this means CN 101A updates the value of size field 2240 of the record corresponding to the file shown by file identifier 4130 inside file attributes table 120, to reflect the size after execution of the WRITE operation.

Firstly, CN 101A creates a size field acquisition request. This request includes for search command "SELECT", file attributes table for search destination table, SIZE for acquire field and, for the searching conditions, information specifying conditions equivalent to those for file identifier 4130 as the file-ID field. By running DBMS 102A and processing this SIZE field acquisition request, CN 101A can acquire the value for SIZE field 2240 prior to execution of the WRITE operation.

Next, CN 101A compares the value of the sum of the values registered for OFFSET 4140 and SIZE 4150 of WRITE request 4100 with the value registered in the size field 2240 acquired by the size field acquisition request. If the value acquired through the size field acquisition request is equivalent to or greater than the value of that sum, file size update processes are not necessary so CN 101A finishes update operations for that file attributes table and proceeds to run the next process.

If the value acquired through the size field acquisition request is smaller than the value of that sum, CN 101A updates the file attributes table with a new file size being the value of the sum of offset 4140 and size 4150.

Basically, CN 101A creates a file size update request. The file size update request includes for update command "UPDATE", file attributes table for search destination table, "SET SIZE=new file size" for the update instruction and, for the conditions of the update, information specifying conditions equivalent to file identifier 4130 as the file-ID field. By CN 101A running DBMS 102A and processing this file size update request, the file attributes table is updated and the results are reflected in storage device 600 (step 5075).

When the file attributes table update processes are finished, CN 101A transmits a accounting information DB update request 4700 to CN 101B (step 5080).

FIG. 6 shows a basic example of the contents of an accounting information DB update request 4700. This request has the entries transmission destination MSVR 4710, user identifier USR 4720, file server identifier 4730 and list 4740 of write information for each servers write-in to each server information list 4740.

Write information list 4740 further includes the entries file server identifier 4750, READ completion size 4760, WRITE completion size 4770 and disk size 4780.

Upon receiving the accounting information DB update request from CN 101A, CN 101B performs update processes in accounting information table 220 (step 5080). The update processes for accounting information table 220 will be described subsequently.

Receiving notice from CN 101B that the accounting information DB update request has finished, CN 101A reports to client 800A that the write-in is complete (step 5090) and terminates the WRITE processes (step 5100).

Figure 9:
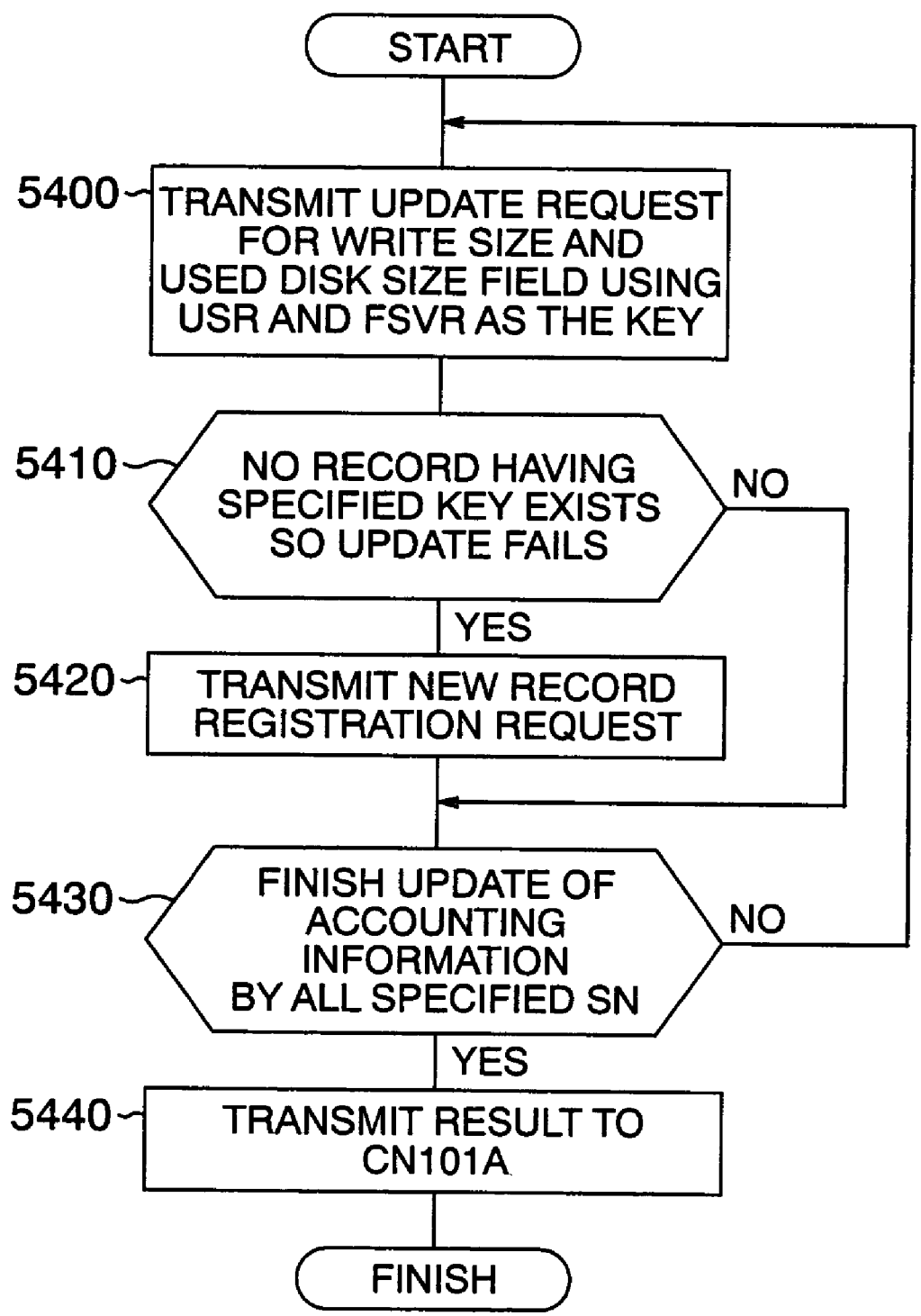
FIG. 9 is a flowchart showing the processes of MSVR 100B.

FIG. 9 shows the procedures for the update processes in accounting information table 220 performed by CN 101B upon receipt of the accounting information DB update request.

First, CN 101B creates database update request 6200 instructing searching, with the pair of the user identifier and the identifier showing SN 301 as the key, of a record matching that pair inside accounting information table 210 and instructing that the information registered in the disk size 4780 and WRITE size 4770 entries included in the accounting information DB update request be added, respectively, to the usage volume 3130 and Wsize 3160 entries included in the a record thus searched, and commences running DBMS 102 B.

Figure 12:
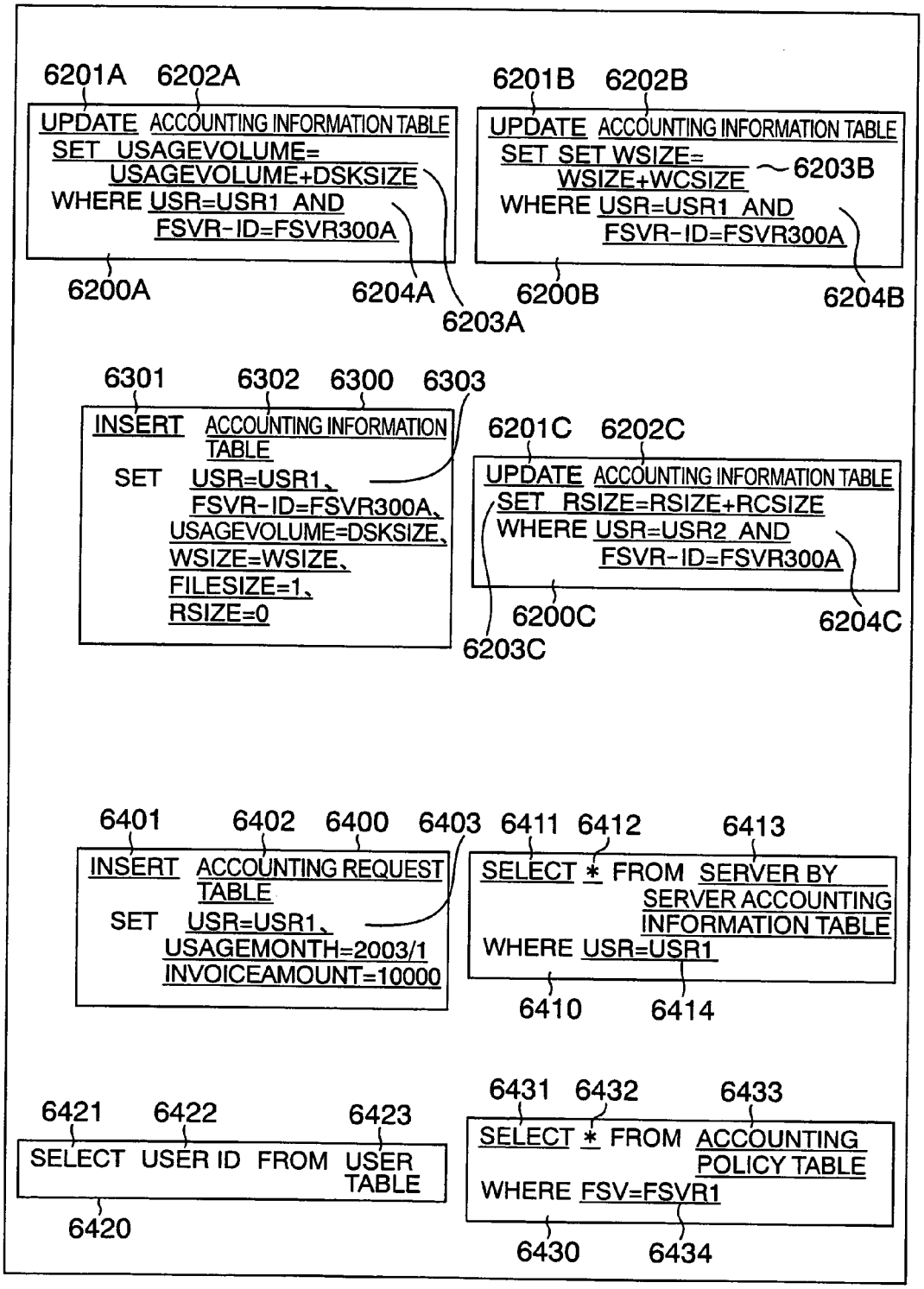
FIG. 12 shows examples of a accounting information table update request and registration request and registration and searching requests for the different kinds of tables used for the processes for calculating an amount for invoice.

A database update command request has the entries command name 6201, update table name 6202, update information 6203 and searching conditions 6404. FIG. 12 shows a basic example of a database update request 6200. The information shown in the entries for database update request 6200A (and B) is "UPDATE" for command name 6201A (and 6201B), "accounting information table" for update table name 6202A (and 6202B) and "USR=USR1 AND FSVR-ID=FSVR300A for searching conditions 6204A (and 6204B). Further, information showing "usagevolume=usagevolume+DSKsize" is specified in update information 6203A and information showing "Wsize=Wsize+WCSIZE" is specified in update information 6203B.

According to this embodiment the two records existing are record 3111 inside accounting information DB 210 selected by the key USR 1 and FSVR 1 and record 3112 selected by the key USR 1 and FSVR 3. Thus, CN 101B first creates database update command 6200A (and 6200B) in respect of record 3111 selected by the key USR 1 and FSVR 1 and runs DBMS 102B (step 5400).

Based on that update command 6200A (and 6200B) as created, CN 101B running DBMS 102 B performs write-in processes to storage device 600A of the results of the sum of the newly allocated disk size and the size after the write-in is complete into the usage volume 3120 entry and Wsize 3150 entry of each record.

If at the time of the database update processes no record exists matching the combination of the specified user identifier and identifier specifying FSVR 300, accounting information DB update processes produce an error. Then, CN 101B collects from storage device 600A, information (the results of the executed processes) showing whether or not the processes of database update request 6200 were successful.

CN 101B refers to the results of the executed database update request colleted and decides whether the processes were successful (step 5410).

If the accounting information DB update processes based on the key of USR 1 and FSVR 1 fail, it means that a record matching that USR 1 and FSVR 1 key does not exist in accounting information table 220. Accordingly, when an error occurs CN 101B must transmit an add new record request to storage device 600A. Such an error occurs when the write-in is for a new file but here, because it is an example of write-in-for an existing file, the error does not occur (step 5420). Details of these processes are described in the subsequent description of new file creation processes.

If the database update processes request in respect of USR 1 and FSVR 1 completes, CN 101B decides whether or not the processes in respect of all the SN 301 specified in write-in to each file server information list 4740 of accounting information DB update request 4700 have been completed (step 5430). If those processes are not completed, the system reverts back to steps 5400 through 5420. According to this embodiment, CN 101B repeats steps 5400 through 5420 in respect of the next record with USR 1 and FSVR 3 as the key.

Once the accounting information update processes specified in write-in to each file server list 4740 included in the accounting information DB update request are complete for all SN 301, CN 101B transmits the results to CN 101B thus completing the process (step 5440).

In this way the accounting information of each SN 301 can be easily managed through managing accounting information at the databases.

For this embodiment, the description used an example wherein file attributes DB110 and accounting information DB 210 are managed by different CN 101 however a configuration in which both those DB are managed by one CN 101 is also suitable.

An example of file read, READ, processes by a user via client 800A will now be described. Here, the explanation proceeds assuming that a file (hereinafter "FILE 2") has already been created in the system.

When a user (hereinafter "USR 2") using client 800A performs a read of file 2, client 800A first runs AGENT 810 and transmits READ request 4200 to CN 101A.

The middle layer in FIG. 4 shows a basic example of a READ request. In the READ request 4200 are included each of the entries command type 4210, user identifier 4220, file identifier 4230, read command offset 4240 and data size 4250. In this example "READ" showing that this is a file read request is registered in the command type 4210 entry, "USR 2" is registered in the user identifier 4220 entry and information showing "FILE 2" is registered in the file identifier 4230 entry. In READ command offset 4240 and data size 4450 respectively is stored the location to which the data should be read in the file and the data size.

Unless otherwise required, CN 101A performs the processes by running MSVR 100A.

Upon receiving the READ request 4200, in order to confirm access rights of the user, CN 101A creates ACL table search request 6000B to search ACL table 130 using the received FILE 2 file identifier and the USR 2 user identifier as the key. Next, CN 101A runs DBMS 102A, transmitting the above ACL table search request 6000B to storage device 600A and acquires information on the access rights from storage device 600A.

FIG. 11 shows a basic example of ACL table search request 6000B. In the respective entries of ACL table search request 6000B is registered information that for command name 6001 B specifies "SELECT", for select field name 6002B specifies "READ", for searching subject table name 6003B specifies "ACL table" and for searching conditions 6004B "FILE-ID=FILE2 AND OWNER=USR2 AND CURDATE( )<EXPIRE".

According to this ACL table search request 6000B, CN 101A runs DBMS 102A and selects from the ACL table a record for which FILE-ID holds file 2, OWNER field holds USR 2 and the expire field is a period greater than the current date, and acquires the READ field from storage device 600A.

According to this embodiment, record 2113 is the record fulfilling the conditions registered in the entry for searching conditions 6004B, so here, CN 101A can acquire the value registered in the READ field 2130 of record 2113 from storage device 600A area.

Thereafter, CN 101A decides whether or not the READ request is authorized or not based on whether or not the value of the READ field obtained through running DBMS 102A is 1. Here, the value of READ field 2130 is 1 so CN 101A decides that this READ request is authorized.

When the value of READ field 2130 is 0, CN 101A decides the READ request is not authorized, notifies this non-authorization to client 800A and terminates procedures.

When the READ request is authorized, CN 101A must ascertain the location of the file to be read. CN 101A acquires information on the location, comprising the location of the file to be read from storage device 600, by running DBMS 102A just as in the case of the WRITE processes and processing the location table searching request 6100. At this time "FILE-ID=FILE 2" is specified for searching conditions 6140 of location table searching request 6100.

For this embodiment the location information obtained from these processes is the two items "FSVR 1:/FILE 2" and "FSVR 3:/FILE 2".

Next, CN 101A uses the file identifier FILE 2 to search file attributes table 120 and reads-out the record that satisfies the conditions from storage device 600A. CN 101A then acquires the information registered in the entries file size 2240 and file type 2250 of the selected record. According to this embodiment, CN 101A acquires from selected record 2212 the information file size 20 MB and file type ENCRYPT.

Here, the information ENCRYPT means that the file is of a file type that must be encrypted before transmission when CN 101A transmits a file on to client 800. Accordingly, when transmitting the file on data to client 800A, CN 101A must encrypt the file data using the encryption key stored in extended attributes table 140.

According to this embodiment, because the data can be acquired from any SN 301 managed storage device 600 where that file data is stored, CN 101A can issue local file READ request 4600 to SN 101A or SN 101C or to both.

The following description provides an example where CN 101A transmits a local file READ request to SN 301A connected to the same network 700 as CN 101A, however it would also be suitable for CN 101A to issue to both SN 301A and to SN 301C a local file READ request to read one-half of the data out from each.

The middle layer in FIG. 5 shows a basic example of a local file READ request 4600. In this local file READ request 4600 are included the entries transmission destination FSVR 4610, local file I/O command 4620, local filename 4630, OFFSET 4640 and SIZE 4650. The information "READ" indicating a file read is registered in the entry local file I/O command 4620. "FILE 2" indicating FILE 2 is registered in the entry local file name 4630.

Unless otherwise required the processes of SN 301A are performed by running FSVR 300A.

Upon receiving local file read request 4600 SN 301A performs local file READ processes to read data of the size specified in the entry SIZE 4550 from the location registered in the OFFSET 4640 entry of the specified local file. Basically, SN 301A issues the read request to the appropriate storage device 600B to acquire the required file data.

After finishing the local file READ processes SN 301A transmits the data read and the size to CN 101A.

Upon receiving the results of the local file READ request from SN 301A, CN 101A checks the status included in the result received to confirm whether or not the local file read operation was successful.

If the local file READ processes of SN 301A fail, CN 101A issues the same request to SN 301C. In this way when a plurality of replications of a local file exist even if the read by a SN 301 fails it is possible for the read processes to be performed using another SN 301 thereby providing a more reliable system. If the read operations of all SN 301 registered in location table 150 fail CN 101A returns an error to client 800.

If the local file read from SN 301A is successful CN 101A creates a accounting information DB update request 4700 and transmits it to CN 101B. Thereafter unless otherwise required CN 101B performs processes by running MSVR 100B.

CN 101B having received accounting information DB update request 4700, first creates accounting information table update request 6200C instructing that storage device 600A, using the pair of the user identifier and the identifier showing FSVR 300 as the key, searches a record matching that pair inside accounting information table 210 and adds in the information registered in the READ completion size 4760 entry included in accounting information DB table update request 6200C to the Rsize 3140 entry included in the record thus searched.

Accounting information table update request 6200C has the entries command name 6201, update table name 6202, update information 6203 and searching conditions 6204. FIG. 12 shows an example in which the registered information specifies "UPDATE" for command name 620C1, "accounting information table" for update table name 6202C, Rsize=Rsize+RCSIZE for update information 6203C and "USR=USR2 AND FSVR-ID=SN 301A for searching conditions 6204C.

In accounting information table 220 the record corresponding to the combination USR 2 and SN 301A is record 3113.

Accordingly CN 101B runs DBMS 102 B and instructs storage device 600A through accounting information table update request 6200C, to perform write-in processes of the result to the Rsize 3140 entry of record 3113 of the result of the added up READ completion size entry.

Next, CN 101B decides whether or not the processes have been completed for all file servers specified in write-in to each file server information list 4740 of accounting information DB update request 4700, and if those processes are not completed the aforementioned database up date request processes are repeated. According to this embodiment, as there is no other specified file server, at this point CN 101B terminates accounting information update processes and transmits the result to CN 101A.

Upon receiving notification from CN 101B that accounting information DB update request processes have completed, CN 101A searches extended attributes table 140 inside storage device 600A using the FILE 2 file identifier as the key to confirm that FILE 2 is registered in extended attributes table 140. For the purposes of this example CN 101A acquires from the KEY 2420 entry encryption KEY 1 required to transmit FILE 2 to client 800. If the file is not registered in extended attributes table 140, these processes for the attribute concerned (in terms of this example, the encryption) are not performed.

Thereafter, CN 101A using KEY 1, encrypts the read file data and transmits the encrypted file, the result of the read operation, to client 800, completing the READ processes.

Figure 10:
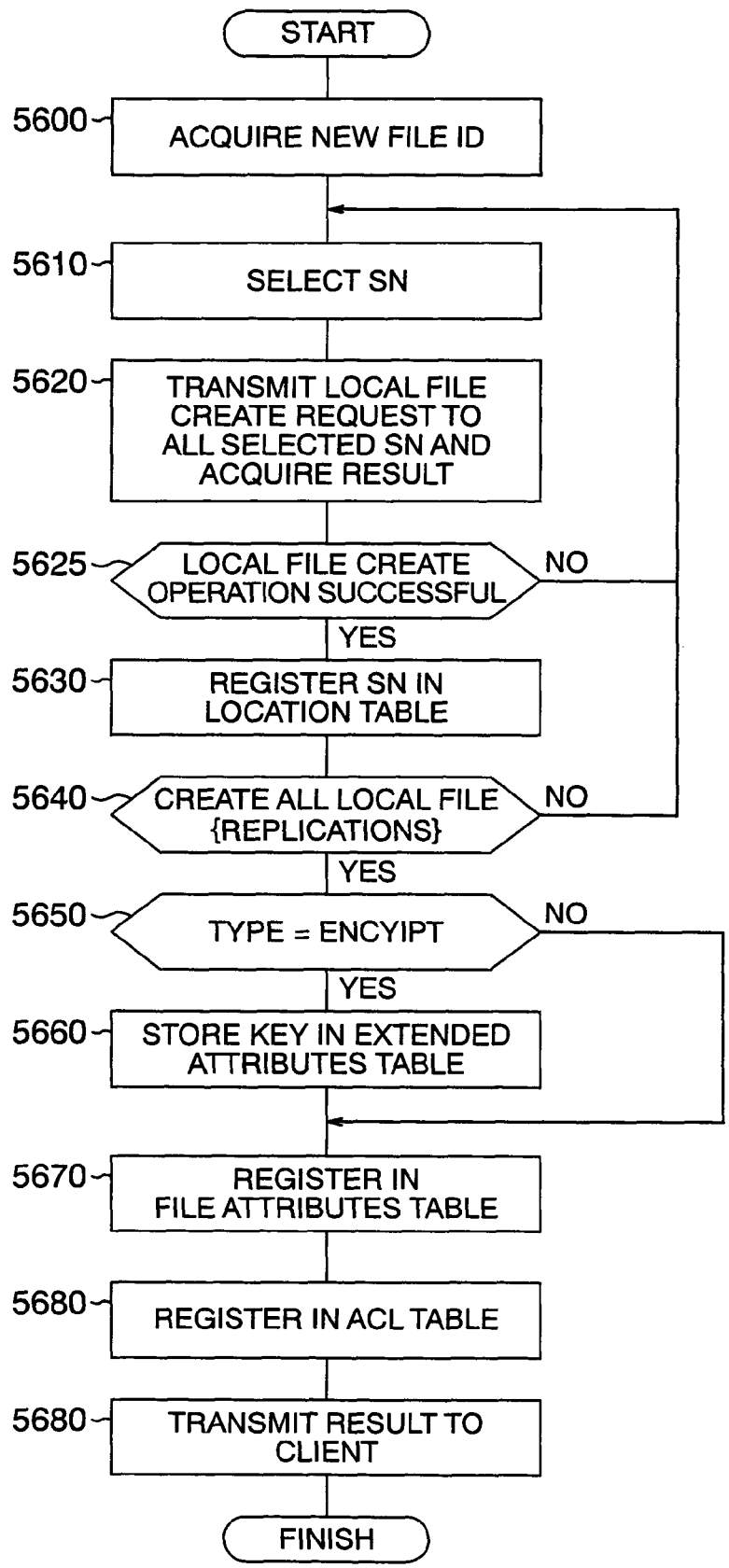
FIG. 10 is a flowchart showing the processes performed when creating a new file.

FIG. 10 shows the processes performed when a new file is created within this computer system. These processes are performed by CN 101A running MSVR 100A.

When a new file is created, the client 800 receiving instructions from a user runs AGENT program 810A and transmits a create request 4300 to CN 101A. The bottom layer in FIG. 4 shows an example of a create request 4300. Create request 4300 includes the entries file create command 4310, user ID 4320, file redundancy 4330, file type 4340, encryption key 4350 and usage term EXP_DATE 4360.

Upon receiving create request 4300, CN 101A acquires a file ID allocated for the file. The file ID bitmap 160 is used for this process. In file ID bitmap 160 are registered file ID's that can be used by this computer system. Bit 1 is allocated for a file ID that is being used by the computer system and bit 0 is allocated to a file not being used.

CN 101A refers file ID bitmap 160 stored in storage device 600A and finds a 0 bit to enable it to acquire an unused file ID. When a 0 bit is found CN 101A instructs storage device 600 to make that bit 1 to indicate that it is being used (step 5600).

Next CN 101 selects SN 301 storing the file data. File redundancy is specified in the create request 4300 and CN 101A therefore selects the appropriate number of SN 301 for the specified level of redundancy. This selection utilizes a method wherein for example CN 101A broadcasts messages over network 700 and selects in order from the first SN 301 returning a reply (step 5610).

Next, CN 101A transmits local file create request 4690 to the SN 301 selected at step 5610 and receives the result of the execution of that request (step 5620). The bottom layer of FIG. 5 shows an example of a local file create request 4690. Local file create request 4690 has the entries FSVR 4691 of name of SN 301 creating the file, local file create command CREATE 4692 and local file name 4693. Here, information showing the file ID selected at step 5600 is registered in local file name 4693.

Upon receiving the local file create request 4690, SN 301 runs FSVR and creates the local file using the value registered in the local file name 4693 entry specified in the command, before returning the result of the operation to CN 101A.

Receiving this result, CN 101A decides whether or not the received result for the local file create operation indicates success (step 5625). If the result is failure CN 101A goes back to step 5610. If the local file create operation is successful CN 101A registers FSVR of the name of the SN 301 successfully creating the local file in location table 150. This registration operation is performed through CN 101A running DBMS 102A. At this time to location registration request 6110 is instructed to storage device 600.

FIG. 11 shows a basic example of a location registration request 6110. Location registration request 6110 includes each of the entries, registration command INSERT 6111, table name 6112 and values to register in record 6113. In this example, for the values set for registration as values to register in record 6113, the file ID allocated at step 5600 is set for the FILE-ID field and the "FSVR" of the name of CN 301 that successfully created the local file and the name of the created local file are set for the LOCATION field (step 5630).

After completing registration of information to location table 150, CN 101A finds out whether or not creation of the number of local files specified in file redundancy 4330 is complete (step 5640). If creation of that number of local files is not complete, the processes from step 5610 are performed again.

If creation of the specified number of local files is complete, CN 101A finds out whether the file type specified at file type 4330 should be registered in extended attributes table 1140, for the purposes of this example, finding out whether that file type is ENCRYPT or not (step 5650).

If the file type is ENCRYPT, CN 101A performs processes to register in extended attributes table 140 the key specified in encryption key 4350 and the FILE-ID. These registration processes are performed by CN 101A running DBMS 102A at which time an extended attributes registration request 6020 is created and issued as an instruction to storage device 600.

FIG. 11 shows an example of an extended attributes registration request 6020. The extended attributes registration request 6020 includes each of the entries DB registration command 6021, extended attributes table name 6022, and values to register in record 6023. For the values set for registration as values to register in record 6023, the file ID allocated at step 5600 is set for the FILE-ID field and the key specified at encryption key 4350 for the KEY field (step 5660).

If CN 101A determines at step 5650 that the file type is not ENCRYPT or after registration of the value in the extended attributes table at 5660, CN 101A performs registration processes in file attributes table 120.

These registration processes in file attributes table 120 are performed by CN 101A running DBMS 102A however before that, CN 101A creates the file attributes table registration request 6030 required when DBMS 102A is run.

FIG. 11 shows an example of a file attributes table registration request 6030. File attributes table registration request 6030 includes each of the entries DB registration command 6031, file attributes table name 6032 and values to register in record 6033. For the values to register in record 6033, the ID allocated at step 5600 is set for the FILE-ID field, the value specified by user ID 4320 is set for the OWNER field, CURDATE( ) showing the current date is set for the DATE field, in the SIZE field is 0 and the value shown by the file type 4340 is set for the TYPE field.

CN 101A refers to file attributes table registration request 6030 when running DBMS 102A, performing registration processes in file attributes table 120 in accordance with the contents of that registration request, reflecting the result of that operation in storage device 600 (step 5670).

After completing the registration process in the file attributes table, CN 101A performs registration processes in the ACL table for the new file. 101A performs this registration process by running DBMS 102A to process the following ACL table registration request 6010.

FIG. 11 shows an example of an ACL table registration request 6010. ACL table registration request 6010 includes each of the entries DB registration command 6011, ACL table name 6012 and values to register in record 6013. For the values set for registration as values to register in record 6013, the file ID allocated at step 5600 is set for the FILE-ID field, the value specified by user ID 4320 is set for the OWNER field and the value EXP_DATE4360 is set in the EXPIRE field (step 5680).

After completing registration processes to the ACL table, CN 101A returns to client 800, information indicating whether or not the file creation processes were successful. At this time, if those file creation processes were successful the file ID is returned to client 800 at the same time (step 5690).

Next an embodiment according to the present invention for calculating amounts to invoice to each user will be described with reference to FIGS. 1 through 13. As described above in this computer system information on usage of storage devices 600 is managed with respect to each SN 301. Accordingly, even where the accounting policies and accounting rates of each SN 301 differ it is still possible to perform accounting processes reflecting those differences.

According to this embodiment, a new accounting server 900 and storage device 600D storing a accounting data DB are added. Like client 800 described above, accounting server 900 is a computer. In storage device 600D are stored all of the types of tables described hereafter. It is also suitable for accounting server 900 and storage device 600D to be integrated in one body or to exist separately. According to this embodiment calculation of the amount to invoice each user is performed using accounting data DB 930.

Basically, accounting server 900 runs accounting calculation program 910 to calculate the amount for invoice. Further, accounting server 900 manages a user ID of a user for performing accounting processes through a user table 940 and manages the accounting policy of each SN 301 using accounting policy table 950.

Further, accounting server 900 searches accounting policy table 950 and user table 940 of storage device 600D and runs DBMS 920, a program for storing the result of the searching operations in accounting information table 960.

FIG. 14A shows an example of the configuration of user table 940. This user table is a table holding information on users using this computer system and includes the entries user ID 7000, name 7010, invoice recipient 7020 and comments 7030.

The top layer in FIG. 14B shows an example of accounting invoice table 960. Accounting invoice table 960 is a table holding information concerning the amount for invoice for each constant period of usage, and based on the information in this table 960, owners of this computer system invoice for usage charges. In this table 960 are included the entries usage month 7110 and invoice amount 7120. It is also suitable in this table 960 to include entries registering information like whether or not the invoice has been issued and whether or not payment has been collected.

FIG. 14C shows an example of accounting policy table 950 holding information on the accounting policies of each file server. Based on information stored in this table 950 and in accounting information DB 210, accounting server 900 calculates the invoice amount for each user. This table 950 includes each of the entries file server name 7200, volume unit price 7210 showing the monetary amount for usage in respect of each unit of volume, file unit price 7220 showing the monetary amount for usage in respect of each file, READ unit price 7230 showing the monetary amount for usage in respect of the unit size of each read and WRITE unit price 7240 showing the monetary amount for usage in respect of the unit size of each write-in.

FIG. 13 shows the processes performed by accounting server 900 running accounting calculation program 910.

Accounting server 900 first acquires a user ID from user table 940 of storage device 600D. This process is performed by accounting calculation server 900 running DBMS 920, performing the following processes for user ID list acquisition request 6420.

FIG. 12 shows an example of a user ID list acquisition request 6420. For this user ID list acquisition request 6420 information showing "SELECT" is registered for search command entry 6421, for acquisition field name entry 6422 "USR" is registered and "User Table" is registered for searching destination table name entry 6423 (step 5600).

Next accounting server 900 acquires the leading user ID of the acquired list (step 5610).

Thereafter, accounting server 900 performs accounting information acquisition processes based on the user ID acquired. These processes are realized by accounting server 900 issuing accounting information searching request 6410 to CN 101B and CN 101B running DBMS 102B.

FIG. 12 shows an example of accounting information searching request 6410. This accounting information searching request 6410 includes searching command "SELECT" 6411, acquire all fields instruction "*" 6412, searching destination table 6413 and searching conditions 6414. The condition specified for searching conditions 6414 is acquisition of the equivalent record as for the user ID acquired at 5600 as the value for USR field 3110 (step 5620).

Accounting server 900, having acquired the accounting information, next calculates the invoice amount in respect of each SN 301. In the acquired accounting information is included records of server by server accounting information table 220 concerning all SN 301 used by the same user. Accounting server 900 uses the value of each FSVR-ID field 3110 included in each record to search accounting policy table 950, acquires the accounting policy for each SN 301 then uses the accounting policies as acquired and the information of the records from server by server accounting information table 220 to calculate the amount for invoicing in respect of each SN 301.

At this time the searching of accounting policy table 950 is performed by accounting server 900 running DBMS 920 and processing a accounting policy table searching request 6430. FIG. 12 shows the configuration of accounting policy table searching request 6430. Accounting policy table searching request 6430 includes search command "SELECT" 6431, acquire all fields instruction "*" 6432, searching destination table "billing policy table" 6433 and searching conditions 6434. The searching conditions 6434 specify the condition that FSVR field 7200 is equivalent to FSVR of the name of the SN 301 the subject of the present invoice amount calculation operation.

The invoice amount corresponding to the selected SN 301 can be calculated by adding to the values included in accounting information acquired at step 5620, namely the values registered in usage volume field 3130, No. of files field 3140, Rsize field 3150 and Wsize field 3160, the respective values of volume unit price 7210, file unit price 7220, READ unit price 7230 and WRITE unit price 7240 (step 5630).

Once the invoice amount for each SN 301 is calculated accounting server 900 totals the amount to be invoiced for all SN 301 and stores the result in accounting invoice table 960. This process is performed by accounting server 900 running DBMS 920 and processing a accounting invoice table registration request 6400.

FIG. 12 shows an example of a accounting invoice table registration request 6400. This table includes search command "INSERT" 6401, registration destination table name "accounting invoice table" 6402 and registration content 6403. Registration content 6403 includes information showing user ID, usage month and invoice amount (step 5640).

Upon completing calculation of the invoice amount for SN 301, accounting server 900 decides whether or not the processes for calculating the amount for invoice has been completed for all users. If there are any users in respect of which those processes are not completed accounting server 900 repeats processes from step 5610 through step 5640 (step 5650).

As described according to this embodiment of the present invention, it is possible to exercise detailed control over accounting operations that reflects the accounting policies of each SN 301.

This invention realizes a computer system providing the flexibility to add file attributes for each file and allowing efficient management of access rights information for multiple users. Further, where a file is stored using a plurality of storage devices managed by servers dispersed in a plurality of sites, this invention realizes a computer system in which accounting information can be managed in respect of each site and each server.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising:
a plurality of first storage devices storing file management information,
a plurality of first computers connected via a storage network to first storage devices,
a plurality of second computers connected via another network to said first computers,
a plurality of second storage devices connected to said second computers, respectively for storing file data managed by said second computers, respectively,
a third computer connected to said first and second computers,
a third storage device connected to said third computer for holding data concerning accounting conditions in respect of each of said second computers,
a client computer connected via said another network to said first computers, and
a file attributes database connected to said third computer for holding an attributes table including file IDs and creation dates for file data, an access right table, and an extended attributes table which is provided for each of said second storage devices and which includes an encryption key,
wherein, when one of said first computers receives an update request for updating file data from a user computer connected via an internet to said another network, said one of said first computers transmits a request to update said file data to one of said second computers,
wherein said one of said second computers executes updating said file data in said second storage devices by referring to said access right table to read data from or write data to said file data and, by referring to said each extended attributes table, and determines whether to encrypt said file data in response to contents of said encryption key of said extended attributes table,
wherein, when said third computer finds an error that has occurred in updating said file data after collecting results of executed processes, said third computer transmits a request for adding a new record in said third storage device, and
wherein said third computer refers to said new record and said each data concerning accounting conditions stored in said third storage device to calculate charges for updating said file data encrypted.

2. A computer system according to claim 1, wherein when said one of said first computers receives said update request to update file data stored in said second storage devices, said one of said first computers confirms the contents of said file management information stored in said first storage devices.

3. A computer system according to claim 2, wherein when said first computer receives a request to read file data stored in said second storage devices, said first computer confirms the contents of said file management information stored in said first storage devices and in accordance with said file management information transmits to said second computer a request instructing read of the file data that is the subject of said request to read file data, based on said instructing request, said one of said second computers reads said file data stored in said second storage devices and transmits said file data thus read to said one of said first computers, and said one of said first computers transmits said file data thus received to the originating sender of the request to read said file data.

4. A computer system according to claim 3, wherein said file management information includes information on file attributes, information on the storage location of file data and information on access rights to a file.

5. A computer system according to claim 4, wherein said file management information includes a table managing only files possessing certain specified file attributes.

6. A computer system according to claim 5, wherein
as said one of said first computers receives a request to read said file data or a request to update said file data, said one of said first computers confirms whether or not a file specified by these requests is registered in said table and if registered, and performs processes in accordance with the file attributes of said table.

7. A computer system according to claim 6, wherein
a file attribute of said table is a file attribute for encryption, and
as said one of said first computers receives a request to read said file data, said one of said first computers confirms whether or not the file specified by these requests is registered in said table for the encryption attribute, and if registered, said one of said first computers encrypts the file data received from said one of said second computers based on the information registered in said table for the encryption attribute and transmits said encrypted file data to the originator of said request.

8. A computer system according to claim 7, wherein said file management information includes information necessary to calculate charges for a user using the computer system.

9. A computer system according to claim 8,
wherein said necessary information includes information on the total volume of file data stored in said second storage devices used by said user, and information on the total volume of data written-in to said second storage devices by said user and the total volume of data read from said second storage devices by said user, and
wherein said necessary information is managed by said one of said second computers managing said second storage devices.

10. A computer system according to claim 9, wherein
when said one of said second computers receives from said one of said first computers said request to update file data, said one of said second computers transmits to said one of said first computers information on the volume of data stored in said second storage devices at the time of processing said request to update said file data and information on the increased data volume through the data update, and
said one of said first computers uses said information thus received to update the contents of said necessary information stored in said first storage devices.

11. A computer system according to claim 8,
wherein said information on file attributes and said necessary information are each stored in different said first storage devices and each managed by different said plurality of first computers.

12. A computer system according to claim 11,
wherein said file data is replicated and stored respectively in among said storage devices existing in plurality.

13. A method of managing data, comprising:
storing file management information in a plurality of first storage devices;
connecting a plurality of first computers via a storage network to the first storage device;
connecting a plurality of second computers via another network to the first computer;
connecting a third computer to said first and second computers;
connecting a third storage device to said third computer for holding data concerning accounting conditions in respect of each of said second computers;
connecting a client computer via said another network to said first computers; and
connecting a file attributes database to said third computer for holding an attributes table including file IDs and creation dates for file data, an access right table, and an extended attributes table which is provided for each of said second storage devices and which includes an encryption key;
wherein, when one of said first computers receives an update request for updating file data from a user computer connected via an internet to said another network, said one of said first computers transmits a request to update said file data to one of said second computers,
wherein said one of said second computers executes updating said file data in said second storage devices by referring to said access right table to read data from or write data to said file data and, by referring to said each extended attributes table, and determines whether to encrypt said file data in response to contents of said encryption key of said extended attributes table,
wherein, when said third computer finds an error that has occurred in updating said file data after collecting results of executed processes, said third computer transmits a request for adding a new record in said third storage device, and
wherein said third computer refers to said new record and said each data concerning accounting conditions stored in said third storage device to calculate charges for updating said file data encrypted.

14. A method according to claim 13, further comprising:
when said one of said first computers receives said update request to update file data stored in said second storage devices confirming the contents of said file management information stored in said first storage devices.

15. A method according to claim 14, further comprising:
when said first computer receives a request to read file data stored in said second storage devices confirming the contents of said file management information stored in said first storage devices and, in accordance with said file management information transmitting to said second computer a request instructing read of the file data that is the subject of said request to read file data,
based on said instructing request received by said one of said second computers, reading said file data stored in said second storage device and transmits said file data thus read to said one of said first computers; and transmitting said file data thus received to the originating sender of the request to read said file data.

16. A method according to claim 15, wherein said file management information includes information on file attributes, information on the storage location of file data and information on access rights to a file.

17. A method according to claim 16, wherein said file management information includes a table managing only files possessing certain specified file attributes.

18. A method according to claim 17, further comprising as said one of said first computers receives a request to read said file data or a request to update said file data, confirming whether or not a file specified by these requests is registered in said table and if registered, and performing processes in accordance with the file attributes of said table.

19. A method according to claim 18, wherein a file attribute of said table is a file attribute for encryption, and further comprising:

as said one of said first computers receives a request to read said file data, confirming whether or not the file specified by these requests is registered in said table for the encryption attribute, and if registered, encrypting the file data received from said one of said second computers based on the information registered in said table for the encryption attribute, and transmitting said encrypted file data to the originator of said request.

20. A method according to claim 18, wherein said file management information includes information necessary to calculate charges for a user using the computer system.

* * * * *